Nov. 10, 1959   R. J. FORMANEK ET AL   2,912,355
COMPOSITION, ARTICLE AND METHOD
Filed June 20, 1955

INVENTORS
ROBERT J. FORMANEK
MATTHEW W. WILSON
BY
ATTY.

United States Patent Office 2,912,355
Patented Nov. 10, 1959

2,912,355
COMPOSITION, ARTICLE AND METHOD

Robert J. Formanek, Kenmore, N.Y., and Matthew W. Wilson, Stow, Ohio, assignors to The B. F. Goodrich Company, New York, N.Y., a corporation of New York Application June 20, 1955, Serial No. 516,658
13 Claims. (Cl. 154—130)

This invention pertains to improvements in the adhesion of rubber to metal. In particular, this invention relates to novel rubbery compositions which can be adhered directly to metal, to novel methods of adhering rubbery compositions to metal and to novel articles of manufacture containing rubber bonded to metal.

Metal organic compounds including the heavy metal fatty acid salts or soaps have been used in the past to promote the adhesion of rubber to metal. However, the degree of adhesion of the rubber containing these compounds to the metal is not as high as is desired for many purposes particularly where the rubber is to be bonded to metal wire to form the fabric plies in tires. It is extremely important that the bond between the rubber ply stock and the wire fabric be as flexible and as strong as possible in order to avoid premature deterioration of the carcass and to prevent failure of the tire under operating conditions. This problem is especially important in the case of truck tires which are subjected to high loads and speeds with consequent heat buildup due to the rapid flexing of the plies. On the other hand, metal organic compounds are easy to use with rubber and it would be highly desirable to be able to employ them in such instances. Hence, it is a primary object of this invention to afford a method for improving the adhesion of rubber to metal utilizing metal organic compounds.

It is another object of this invention to provide a rubbery composition which can be bonded directly to metal, said composition characterized by producing a flexible and strong bond with the metal.

Yet another object of this invention is to provide a rubber composition which can be employed as an adhesive or cement to produce a flexible and strong bond between rubbery materials and metals.

A further object is to provide an article of manufacture having an improved rubber to metal bond.

A still further object is to provide a pneumatic rubber tire having at least one wire fabric ply flexibly and securely bonded to the rubber ply stock.

Figure 1:
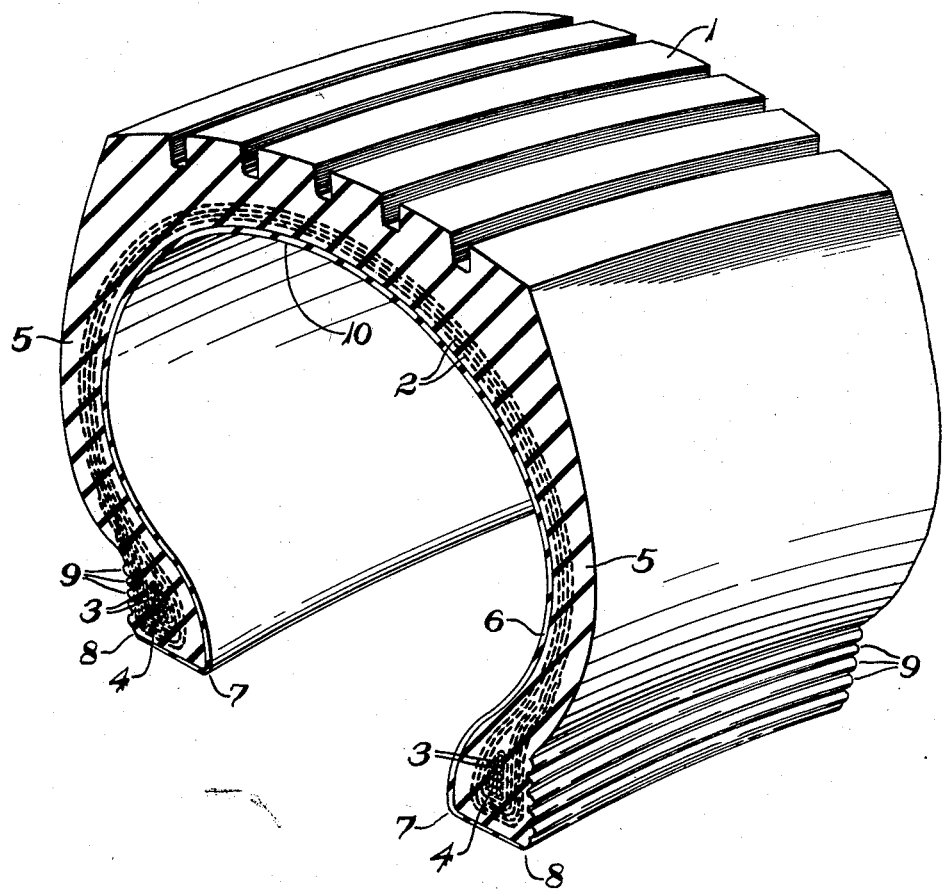
Figure 2:
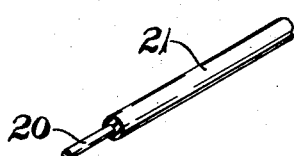

These and other objects and advantages of the present invention will become more apparent to those skilled in the art from the following detailed description, examples and drawing wherein:

Fig. 1 is a fragmentary perspective view partly in section of a tire constructed in accordance with and embodying the present invention, and Fig. 2 is a fragmentary perspective view partly in section of an insulated electrical conductor embodying the present invention.

According to this invention it has been discovered that by partially calcining a metal organic compound, incorporating a minor amount of this partially calcined metal organic compound in a vulcanizable rubber composition and then vulcanizing the rubber composition in contact with a metal surface a flexible and strong rubber to metal bond is obtained. Alternatively, the partially calcined metal organic compound can be deposited as a thin layer on the metal or rubber surface, rubber or metal applied to the same and the assembly then vulcanized. Another method of securing rubber to metal is to prepare a rubber adhesive or cement containing the partially calcined metal organic compound, coat the metal or rubber surface with the adhesive, dry if desired or required, bring the metal and rubber into contact with the adhesive layer between them and vulcanize the same.

Metal organic compounds which are partially calcined and used to improve the adhesion of rubber to metal can be any metal organic compound which can be partially calcined or heated in air to a partial state of oxidation or to a state less than complete oxidation and which contains a portion or residue of the original organic radical(s) in the molecule. The metal atom(s) of the organic compound can be any metal, but it is preferred to employ for best results the polyvalent heavy metals such as cobalt, copper, iron, lead, mercury and nickel. Moreover, while the organic portion(s) or radical(s) of the molecule can be of any type, it is preferred that it contain only carbon, hydrogen and oxygen. Furthermore, it is even more preferred that the metal organic compound be a heavy metal salt of an organic acid, particularly the salts of heavy metals and aliphatic fatty acids. Best results are obtained where the organic chain or portion of the molecule contains a small number of carbon atoms to provide a higher relative concentration of the metal component of the compound. Mixtures of metal organic compounds can be employed and they can be partially calcined in admixture or partially calcined and then mixed before incorporation into the rubber or used to adhere the rubber to the metal. Examples of suitable metal organic compounds which can be partially calcined and used in practice of the present invention are cobaltous acetate, cobaltous benzoate, cobaltous butyrate, cobaltous citrate, cobaltous formate, cobaltous oleate, cobaltous tartrate, cupric acetate, cupric benzoate, cupric butyrate, cupric stearate, ferric acetate, ferric benzoate, ferric formate, lead acetate, lead citrate, lead palmitate, mercuric acetate, mercuric benzoate, mercuric propionate, nickel acetate, nickel oxalate, nickel propionate, nickel stearate, silver acetate, silver stearate and the like.

The metal organic compounds are calcined in air, oxygen or other oxidizing gas at a temperature and for a time sufficient to partially calcine or oxidize the compound. Depending on the amount of calcination desired it can be conducted at various temperatures and times so long as the compound is not entirely converted to its oxide. The metal organic compound thus can be given a light or heavy roast to oxidize a minor amount or a major amount of the organic and/or metal component of the compound and to remove all or a portion of the water of hydration if any is present. Best results are obtained by heating under oxidizing conditions below the ignition point of the compound. An example of a suitable method for partially calcining a metal organic compound very useful in adhering rubber to metal is to heat cobalt acetate (5 lbs.) in a pan in air at a temperature of from about 150 to 170° C. for from about 24 to 72 hours. Times and temperatures of course, will vary according to the amount, thickness, and chemical composition of the sample being partially calcined.

Even very minor amounts, based on the weight of the rubber present, of the partially calcined metal organic compounds will show some improvement in the adhesion of the rubber to the metal base. For example, about 0.1% by weight of the partially calcined metal organic compound will show an appreciable improvement in the adhesion of rubber to metal. Moreover, minor amounts up to about 10% by weight of the partially calcined metal organic compound will show significant improvements in the adhesion of rubber to metal. However, it is not desired to go much above 10% by weight as the properties such as tensile strength, etc., of the rubber composition itself may be somewhat lessened. Best results are obtained by using from about 1 to 4% total by weight of the partially calcined metal organic compound based on the weight of the rubber.

The rubber or rubbery material to be bonded to the metal base is any vulcanizable naturally occurring crude rubber such as caoutchouc which is essentially a rubbery polymer of isoprene, and the like, or such synthetic rubbers as the rubbery polymers of the open chain conjugated dienes having from 4 to 8 carbon atoms such as the butadiene-1,3 hydrocarbons which include butadiene-1,3; isoprene; 2,3-dimethyl butadiene-1,3; 1,4-dimethyl butadiene-1,3; piperylene; and the like; chlorobutadiene-1,3; and mixtures thereof; or the copolymers of these and similar materials with each other or with such copolymerizable monomeric materials as isobutylene, styrene, methyl styrene, chlorostyrene, acrylonitrile, methacrylonitrile, alpha chloroacrylonitrile, methyl acrylate, ethyl acrylate, butyl acrylate, methyl methacrylate, ethyl methacrylate, 2-vinyl pyridine and similar materials and mixtures thereof such as the polymers obtained by interpolymerizing 3, 4 or more monomers, for example, the polymer obtained by interpolymerizing butadiene-1,3, styrene and acrylonitrile. In the foregoing rubbers the conjugated diene generally amounts to at least 50% by weight of the copolymer and preferably amounts to about 55–85% by weight of the co- or interpolymer, the balance being usually the copolymerizable olefinic monomer(s). Examples of such copolymers are those comprising butadiene-1,3 and styrene wherein the diene is present in an amount of from about 55–85% by weight or butadiene-1,3 and acrylonitrile wherein the diene is present in an amount of from about 55–65% by weight. Still other rubbery polymers can be used such as "butyl" rubber which contains about 97½% isobutylene and the balance isoprene, the rubbery olefin polysulfide polymers known as the "Thiokol" rubbers, the rubbery polyacrylates formed by the homo- and copolymerization of alkyl acrylates or of alkyl acrylates and alkyl alkacrylates and the rubbery polymers containing a curable —COOH or —COOR group formed, for example, by the copolymerization of an open-chain conjugated diene with an olefinically unsaturated carboxylic acid or by the reaction of a polymeric diene with a carboxylating agent to obtain a carboxyl-containing polymer. Rubbery materials formed by the reaction of a diisocyanate with a hydroxyl terminated polyester from the condensation of a dicarboxylic acid and a glycol and with a glycol can be used in practice of the present invention. Mixtures of the various rubbers disclosed herein are also useful. Of the various rubbers which can be employed it is preferable to employ the sulfur vulcanizable rubbers, natural or synthetic, which have been milled (broken down, plasticized or otherwise treated in air) and/or which contain a minor amount of free sulfur (not bound and in excess of that needed for curing) based on the rubber present in order to obtain the highest adhesions. In place of sulfur a sulfur group element can be used, or a compound furnishing sulfur or a sulfur group element can be used.

The partially calcined metal organic compound can readily be added to or mixed with the rubber material on a rubber mill, in a Banbury mixer, etc. and the like. It can also be dispersed in aqueous dispersions of rubber or latex and coagulated with the rubber or it can be dispersed into rubber dissolved in a suitable rubber solvent where dipped goods, adhesives or cements are to be made.

Compounding ingredients customarily employed in the rubber art are also desirably added to the rubber composition and can include accelerators, antioxidants, bactericides and the like, color pigments, extenders, reinforcing pigments, softeners, vulcanizing agents, etc. Examples of useful compounds of this type are phenyl beta naphthylamine (Age Rite Powder), aldol alpha naphthylamine (Age Rite Resin), 2-mercaptobenzothiazole disulfide (Altax), polymerized trimethyl dihydroquinoline (Age Rite Resin D), N-cyclo-hexyl-2-mercaptobenzothiazole sulfene amide, polyaralkylated phenols (Spar), 2-mercaptobenzothiazole (Captax), precipitated silicon dioxide, precipitated calcium silicate, the zinc salt of mercaptobenzothiazole, red iron oxide, zinc oxide, magnesia, titanium dioxide, yellow iron oxide, arc silica, "Monox" or silicon monoxide, clay, carbon black, stearic acid, cellulose flock, hexamethylene tetramine, sulfur, pine tar oil, Paraflux heavy oil, tetramethyl thiuram disulfide, calcium hydroxide, triethyl trimethylene triamine and sulfur, triethylene tetramine and sulfur, sodium metasilicate pentahydrate, red lead and paraquinone dioxine, rosins, resins, etc. The compounding ingredients are used in the amounts necessary to achieve the desired properties in the resulting vulcanizate as is well known to those skilled in the art.

The metal base to which is applied the rubber composition containing the partially calcined metal organic compound should have a clean surface, that is, it should be free of dirt, oxides, rust, scale, oil, and grease but does not otherwise have to be specially prepared prior to use. The metal or metal surface to which the rubber is bonded can be of any metal to which it is desired to secure rubber. However, for the highest adhesions it is preferred that the base metal or metal surface be of copper, iron, lead, tin and zinc and their alloys. Moreover, the base metal may be coated with another metal by clading, electroplating, hot dipping, etc. to provide a coating of the desired metal. The resulting coating can be relatively thick or thin and continuous or discontinuous as desired. Processes for coating metals or alloys thereof with another metal or alloy are well known to those skilled in the art.

After the rubber composition containing the partially calcined metal organic compound and compounding ingredients has been prepared it can be applied directly to the cleaned metal surface and vulcanized thereto by heat and pressure. While as described above, adhesives or cements can be employed to bond the rubber to the metal, a feature of the composition and method of the present invention is that the adhesive coating step can be avoided. For example, in making wire fabric ply stock, the rubber stock can be calendered directly onto the wire fabric plies thus eliminating the steps of dipping and drying and their attendant equipment which are required with the use of adhesives. However, adhesives or cements prepared using the composition of the present invention can advantageously be employed to bond rubber to a metal surface. Moreover, the partially calcined metal organic compound also can be dusted on or used to coat the surface of rubber or metal which are then brought together and the assembly cured. The partially calcined material serves to bind the rubber to the metal during the curing step.

Many useful products can be prepared utilizing the composition and method of the present invention. For example, heavy duty tires can be produced having strong and flexible plies. As shown in the drawing Fig. 1, of a representative tubeless tire, 1 is the tread stock which is united during vulcanization to one or more plies of calendered rubber-wire fabric cord plies 2—2 in which the rubber contains a partially calcined metal organic compound as disclosed herein. The ends of the plies may be wrapped around metal wires 3—3 forming beads 4—4 which can be impregnated with the adhesive composition of the present invention. The sidewalls of the tire are generally indicated by the numerals 5—5. Substantially air-impervious liner 6 such as a "butyl" rubber composition, a copolymer of a predominating amount of isobutylene and the balance isoprene which may or may not comprise reclaim "butyl" or brominated "butyl," covers the entire inside area of the tire and may even extend around toe 7 and heel 8 of the bead to provide an airtight seal. The axial outer face of the bead portion can contain ribs 9—9 extending in a circumferentially continuous manner about the tire to effect sealing against leakage of air from the tire past the bead portion as well as entrance of extraneous materials from without. Modification of the ribs can be made as is well known in the art. If desired a puncture sealing rubber composition can be placed in the inner crown portion 10 of the tire adjacent layer 6 and generally under the area covered by the tread and tapering somewhat downward along a portion of the sidewall areas. Such tires can be made by conventional methods of building tubeless tires. Moreover, other tires such as those utilizing tubes can also contain wire fabric bonded to rubber containing a partially calcined metal organic compound as well as tubes if it is desired to reinforce them with metal wire fabric. Furthermore, the composition and method of the present invention is not limited to use in pneumatic tires or tubes but can also be used to make other products. As shown in Fig. 2, electrical conductor 20 of copper or other metal can have an extruded and vulcanized jacket 21 of a rubber composition containing a partially calcined metal organic compound to improve adhesion of the jacket to the conductor. The present invention will also find utility in metal-rubber articles such as motor mounts, cutless bearings, torsilastic springs, power belts, printing rolls, metal wire reinforced or braided hose, electrical de-icers, shoe heels, and wherever it is desired to secure rubber to metal to provide a flexible and strong bond between the same.

The following examples will serve to illustrate the invention with more particularity to those skilled in the art:

EXAMPLE I 5 lbs. of hydrated cobalt(ous) acetate $(Co(CH_3COO)_2 \cdot 4H_2O)$

in a pan was placed in an electric furnace open to the air and heated for 24 hours at about 160° C. to lightly calcine it. Two parts by weight of this material were then mixed on a rubber mill with 100 parts by weight of milled natural rubber, 4.5 parts by weight of sulfur and other conventional compounding ingredients such as carbon black, zinc oxide, antioxidant, accelerator, and plasticizer in customary amounts. Similar compositions were prepared in which the partially calcined cobalt acetate was replaced with hydrated cobalt acetate or anhydrous cobalt acetate. A control without any cobalt compound was also tried. The compositions were then ready for testing their adhesion to wire.

The wire, uncoated bright twisted steel 7 x 3 x .0058" with a strand lay of 0.270" and a cable lay of 0.730", was cut into 9" lengths. Where not preformed, the ends of the wire were soldered to prevent individual strands from untwisting. Then, the wires, free of rust and scale, were cleaned of grease and oil by wiping them with ethylene dichloride. Six wires, 1" apart, were embedded in a 6" x 1" x 1" block of each of the above rubber compositions. The blocks were press cured in a platen press for 60 minutes at 280° F. and permitted to age at room temperature for 24 hours. After aging, samples were cut from each block for test in a 250 pound Scott Tensile machine in which the upper jaw had been modified to include a plate or piece of angle iron for holding the rubber sample against relative movement and provided with a slot through which the end of the wire protruded to be gripped by the lower jaw of the machine. Each sample was then tested in the machine by pulling the wire from the rubber block at a jaw speed of 1" per minute and the maximum load (pounds) required to pull the wire free was recorded as adhesion and is shown in Table A below:

Table A

| Composition Containing Particular Cobalt Compound | Adhesion, Range in Pounds | Adhesion, Average Pounds |
| --- | --- | --- |
| Lightly calcined cobalt acetate | 68–90 | 80 |
| Anhydrous cobalt acetate | 55–74 | 68 |
| Hydrated cobalt acetate | 53–61 | 57 |
| None (control) | 16–22 | 20 |

This example illustrates the fact that even a light calcination of the cobalt acetate will provide significant improvements in the adhesion of vulcanized rubbery compositions to metal surfaces. Moreover, the wire pulled from the sample treated with the lightly calcined cobalt acetate had particles of rubber adhering to it while the other wires were clean. This indicates that to some extent the partially calcined cobalt acetate-rubber-metal bond is stronger than the rubber matrix itself.

EXAMPLE II

This example was similar to Example I, above, except that a separate portion of the cobalt acetate was heated at about 160° C. for 72 hours to heavily calcine it so that more of the resulting product was oxidized. Another portion of the cobalt acetate was completely oxidized. 2 parts by weight of the heavily calcined cobalt acetate were then mixed with 100 parts by weight of milled natural rubber, 2.5 parts by weight of sulfur and other conventional compounding ingredients such as carbon black, zinc oxide, stearic acid, antioxidant accelerator and plasticizer in the customary amounts and cured with a heavy zinc electroplated, twisted steel wire in place of the ungalvanized wire of Example I. Similar compositions were prepared using oxidized, anhydrous, hydrated and lightly calcined cobalt acetate and cured against the galvanized wire. After test, the following results were obtained:

Table B

| Composition Containing Particular Cobalt Compound | Adhesion, Range in Pounds | Adhesion, Average Pounds |
| --- | --- | --- |
| Heavily calcined cobalt acetate | 86–116 | 99 |
| Lightly calcined cobalt acetate | 87–107 | 96 |
| Anhydrous cobalt acetate | 82–98 | 89 |
| Hydrated cobalt acetate | 81–90 | 86 |
| Cobalt oxide | 45–50 | 43 |
| None (Control) | 20–24 | 22 |

This example shows that further calcination of the cobalt compound will provide important increases in the adhesion of rubber to metal but that complete calcination of the cobalt compound is not desired as this results in actual loss of adhesion or rather fails to show much improvement over the control which did not contain any cobalt adhesion promoting compound. All of the wires pulled clean from the samples except in those instances where the rubber contained lightly or heavily calcined cobalt acetate. This again indicates that the bond produced by the use of partially calcined cobalt acetate is stronger than the rubber matrix itself.

When the partially calcined cobalt compounds of the foregoing examples were replaced with partially calcined cobalt butyrate, benzoate, citrate, formate, oleate or tartrate similar improvements in adhesion of rubber to metal were obtained as compared to the corresponding uncalcined organic cobalt compounds. Likewise, the use of partially calcined cupric acetate or benzoate, ferric benzoate, lead acetate, mercuric benzoate, nickel oxalate and silver stearate also provided significant improvements in adhesion of rubber compositions to base metals as compared to the use of the corresponding uncalcined or completely calcined metal-organic compounds.

Moreover, rubber compositions containing partially calcined cobalt acetate were calendered against twisted steel wire cords to make wire plies and built into truck tires and vulcanized. Actual road tests using such tires having wire cords exhibited improved life and serviceability in that there was little or no deterioration or separation of the plies after months of heavy use as compared to tires having cord plies in which the rubber stock for the plies did not contain partially calcined cobalt acetate.

In summary, the present invention teaches that the use of partially calcined metal organic compounds will provide significant improvements in the adhesion of rubbery materials to metals or metallic surfaces over that afforded by the uncalcined or completely calcined metal organic compounds. The metal organic compound can be lightly or heavily calcined as long as it is not entirely converted to the oxide form or completely calcined. In practice of the present invention many partially calcined metal organic compounds can be employed in minor amounts as compared to the amount of rubber used and will permit the adhesion of rubber to many metal surfaces to provide increased strength between the same and to improve the overall properties of and to increase the uses of the resulting articles.

What is claimed is:

1. A composition of matter comprising a vulcanizable rubbery material and from about 0.1 to 10.0% by weight based on the weight of the rubber in said rubbery material of a metal salt of an aliphatic fatty acid compound, the metal of said compound being selected from the group consisting of cobalt, copper, iron, lead, mercury, nickel and silver and said compound having been partially oxidized by heating under oxidizing conditions at a temperature about 150 to 170° C. for a time about 24 to 72 hours.

2. A composition of matter comprising a sulfur vulcanizable milled rubber, about 2.5 to 4.5% by weight based on the weight of said rubber of sulfur and from about 1 to 4% by weight based on the weight of said rubber of a metal salt of an aliphatic fatty acid compound, the metal of said acid compound being selected from the group consisting of cobalt, copper, iron, lead, mercury, nickel and silver and said acid compound having been partially oxidized by heating under oxidizing conditions at a temperature about 150 to 170° C. for a time about 24 to 72 hours.

3. A composition of matter according to claim 2 in which said acid compound comprises cobalt acetate and said rubber comprises natural rubber.

4. The method which comprises depositing a layer of a metal salt of an aliphatic fatty acid compound on the surface of a metal base, applying a layer of a vulcanizable rubbery material to said layer of said compound and vulcanizing the same, the metal of said compound being selected from the group consisting of cobalt, copper, iron, lead, mercury, nickel and silver, said compound being present in an amount of from about 0.1 to 10.0% by weight based on the weight of the rubber present in said rubbery material and said compound having been partially oxidized by heating under oxidizing conditions at a temperature about 150 to 170° C. for a time about 24 to 72 hours.

5. The method which comprises mixing a metal salt of an aliphatic fatty acid compound with a vulcanizable rubber containing composition to form an adhesive, said compound being present in an amount of from about 0.1 to 10.0% by weight based on the weight of the rubber in said adhesive, depositing a layer of said adhesive on the surface of a metal base, applying a layer of a vulcanizable rubbery material to said adhesive layer and vulcanizing the same, the metal of said compound being selected from the group consisting of cobalt, copper, iron, lead, mercury, nickel and silver and said compound having been partially oxidized by heating under oxidizing conditions at a temperature about 150 to 170° C. for a time about 24 to 72 hours.

6. The method which comprises mixing a metal salt of an aliphatic fatty acid compound with a vulcanizable rubbery composition, said compound being present in an amount of from about 0.1 to 10.0% by weight based on the weight of the rubber in said composition, depositing a layer of said composition in adhering relationship with the surface of a metal base and vulcanizing the same, the metal of said compound being selected from the group consisting of cobalt, copper, iron, lead, mercury, nickel and silver and said compound having been partially oxidized by heating under oxidizing conditions at a temperature about 150 to 170° C. for a time about 24 to 72 hours.

7. The method which comprises mixing together a sulfur vulcanizable milled rubber, about 2.5 to 4.5% by weight based on the weight of said rubber of sulfur and from about 1.0 to 4% by weight, based on the weight of the rubber of a metal salt of an aliphatic fatty acid compound, the metal of said acid compound being selected from the group consisting of cobalt, copper, iron, lead, mercury, nickel and silver, depositing a layer of the resulting mixture in adhering relationship with the surface of a metal base selected from the group consisting of copper, iron, lead, tin, and zinc and their alloys and vulcanizing the same, said acid compound having been partially oxidized by heating under oxidizing conditions at a temperature about 150 to 170° C. for a time about 24 to 72 hours.

8. The method according to claim 7 wherein said acid compound comprises cobalt acetate and said rubber comprises natural rubber.

9. An article of manufacture comprising a metal base and a layer of a vulcanized rubbery material secured thereto by means of an interposed layer comprising a metal containing compound and exhibiting an improved metal to rubber bond after vulcanizing said rubbery material to said metal base, said compound prior to vulcanizing in combination with said base and said material comprising a heavy metal salt of an aliphatic fatty acid compound, being present in an amount of from about 0.1 to 10% by weight based on the weight of the rubber in said rubbery material and having been partially oxidized by heating under oxidizing conditions at a temperature about 150 to 170° C. for a time about 24 to 72 hours and the metal of said compound having been selected from the group consisting of cobalt, copper, iron, lead, mercury, nickel and silver.

10. An article of manufacture comprising a metal base and a layer of a vulcanized rubbery material secured thereto by means of an intermediate vulcanized adhesive layer and exhibiting an improved metal to rubber bond after vulcanizing said rubbery material to said metal base, said adhesive layer prior to vulcanization comprising a vulcanizable rubbery composition and from about 0.1 to 10.0% by weight based on the weight of the rubber in said composition of a metal salt of an aliphatic fatty acid compound, said compound having been partially oxidized by heating under oxidizing conditions at a temperature about 150 to 170° C. for a time about 24 to 72 hours and the metal of said compound having been selected from the group consisting of cobalt, copper, iron, lead, mercury, nickel and silver.

11. An article of manufacture comprising a metal base and a layer of a vulcanized rubbery material secured thereto, said material containing prior to vulcanization a metal salt of an aliphatic fatty acid compound, said compound being present in an amount of from about 0.1 to 10% by weight based on the weight of the rubber present in said rubbery material, the metal of said compound being selected from the group consisting of cobalt, copper, iron, lead, mercury, nickel and silver and said compound having been partially oxidized by heating under oxidizing conditions at a temperature about 150 to 170° C. for a time about 24 to 72 hours.

12. An article of manufacture comprising a metal base in which the metal is selected from the group consisting of copper, iron, lead, tin and zinc and their alloys and a layer of a vulcanized rubbery material adhered directly thereto, said rubbery material, prior to vulcanizing, comprising a milled sulfur vulcanizable rubber containing about 2.5 to 4.5% by weight based on the weight of said rubber of sulfur and from about 1.0 to 4.0% by weight based on the weight of the rubber in said rubbery material of a metal salt of an aliphatic fatty acid compound, the metal of said acid compound being selected from the group consisting of cobalt, copper, iron, lead, mercury, nickel and silver and said acid compound having been partially oxidized by heating under oxidizing conditions at a temperature about 150 to 170° C. for a time about 24 to 72 hours.

13. An article of manufacture according to claim 12 in which said acid compound comprises cobalt acetate and said rubber comprises natural rubber.

References Cited in the file of this patent

UNITED STATES PATENTS

| | | |
|---|---|---|
| 2,311,656 | Griffith | Feb. 23, 1943 |
| 2,354,011 | Gross | July 18, 1944 |
| 2,366,895 | Griffith | Jan. 9, 1945 |
| 2,386,212 | Griffith | Oct. 9, 1945 |
| 2,501,372 | Benson | Mar. 21, 1950 |
| 2,563,113 | Hindin et al. | Aug. 7, 1951 |

FOREIGN PATENTS

| | | |
|---|---|---|
| 579,238 | Great Britain | July 29, 1946 |

OTHER REFERENCES

Chatfield: "Varnish Constituents," Leonard Hall Ltd. (London), 1953, pages 544–545.

"Condensed Chemical Dictionary," Reinhold Publishing Co., 5th ed., 1956, page 201.